US011236925B2

(12) United States Patent
Kramer (10) Patent No.: US 11,236,925 B2
(45) Date of Patent: Feb. 1, 2022

(54) CONTROL SYSTEM FOR CLIMATE CONDITIONING OF A BUILDING ZONE

(71) Applicant: DYSECO HOLDING B.V., Rotterdam (NL)

(72) Inventor: Rick Paul Kramer, Heerlen (NL)

(73) Assignee: DYSECO HOLDING B.V., Rotterdam (NL)

( * ) Notice: Subject to any disclaimer, the term of this patent is extended or adjusted under 35 U.S.C. 154(b) by 0 days.

(21) Appl. No.: 17/069,357

(22) Filed: Oct. 13, 2020

(65) Prior Publication Data

US 2021/0131694 A1 May 6, 2021

(30) Foreign Application Priority Data

Oct. 31, 2019 (EP) .................................... 19206466

(51) Int. Cl.
*F24F 11/00* (2018.01)
*F24F 11/63* (2018.01)
(Continued)

(52) U.S. Cl.
CPC .............. *F24F 11/63* (2018.01); *F24F 11/50* (2018.01); *F24F 11/80* (2018.01);
(Continued)

(58) Field of Classification Search
CPC .. F24F 11/50; F24F 11/63; F24F 11/64; F24F 11/80; G05D 23/1917
See application file for complete search history.

(56) References Cited

U.S. PATENT DOCUMENTS

| 6,230,980 B1 * | 5/2001 | Hudson ................... G05D 22/02 |
| | | 236/44 A |
| 10,712,036 B2 * | 7/2020 | Mowris ..................... F24F 11/61 |

(Continued)

FOREIGN PATENT DOCUMENTS

JP    02213634 A   *   8/1990

OTHER PUBLICATIONS

European Committee for Standardization, EN15757: Conservation of Cultural Property—"Specifications for temperature and relative humidity to limit climate induced mechanical damage in organic hygroscopic materials," Nov. 2010, 30 pages.
(Continued)

*Primary Examiner* — Mark A Connolly
(74) *Attorney, Agent, or Firm* — Nixon & Vanderhye P.C.

(57) ABSTRACT

The invention relates to a control system for a building zone which is climate conditioned by a climate conditioning system, wherein the climate conditioning system controls at least one climate parameter in the building zone, the climate parameter being at least one of: temperature (T) and humidity (RH). The control system is configured to provide a climate parameter target to a building management system. The climate parameter target is determined dynamically based on current sensor measurements while taking energy, thermal comfort and preservation requirements into account. Namely, rather than continuously steering the climate parameter to reach a preset value, some 'free-running' of the climate parameter is allowed by calculating a permissible range for the climate parameter, which reduces active climate conditioning and thereby contributes to energy savings. To further take preservation requirements into account, the rate of change in the climate parameter is limited to a maximum.

20 Claims, 6 Drawing Sheets

(51) Int. Cl.
*F24F 11/80* (2018.01)
*F24F 11/50* (2018.01)
F24F 110/20 (2018.01)
F24F 120/20 (2018.01)
F24F 110/10 (2018.01)

(52) U.S. Cl.
CPC ....... *F24F 2110/10* (2018.01); *F24F 2110/20* (2018.01); *F24F 2120/20* (2018.01)

(56) References Cited

U.S. PATENT DOCUMENTS

| | | |
|---|---|---|
| 2013/0261808 A1 | 10/2013 | Besore et al. |
| 2016/0313023 A1 | 10/2016 | Przybylski et al. |
| 2018/0087790 A1 | 3/2018 | Perez |
| 2018/0088547 A1 | 3/2018 | Perez |

OTHER PUBLICATIONS

R. Kramer, "Clever Climate Control for Culture: Energy efficient indoor climate strategies for museums respecting collection preservation and thermal comfort of visitors, Eindhoven University of Technology," Jun. 2017, 274 pages.

* cited by examiner

CONTROL SYSTEM FOR CLIMATE CONDITIONING OF A BUILDING ZONE

This application claims priority to EP Patent Application No. 19206466.5 filed Oct. 31, 2019, the entire contents of which are hereby incorporated by reference.

FIELD OF THE INVENTION

The invention relates to a control system for a building zone which is climate conditioned by a climate conditioning system, wherein the climate conditioning system controls at least one climate parameter in the building zone, the climate parameter being at least one of: temperature (T) and relative humidity (RH). The invention further relates to a building comprising the control system, to a computer-implemented method for calculating a climate parameter target for a building zone which is climate conditioned by a climate conditioning system, and to a computer-readable medium comprising instructions for a processor system to perform the computer-implemented method.

BACKGROUND ART

It is desirable to control climate conditions in building zones, e.g., a room or indoor space of a building, for comfort but also for preservation reasons. For example, the indoor conditions of museums, galleries, and archives play an important role in the preservation process of artworks and artefacts. More generally, this applies to all buildings or building structures in which the indoor climate is controlled to preserve the in-house collection, the historic building itself, or its historic interior. Preventive conservation, specifically controlling the indoor air temperature (T) and relative air humidity (RH), is a main reason for applying full air-conditioning systems in museums nowadays. Besides the prevailing T-level and RH-level, fluctuations of T and RH form important boundary conditions in the context of preventive conservation.

Research and practice in the 20th century led to stringent limits for humidity levels and fluctuations around an optimum of 21° C. and 50% RH. In the 1980's, museums became aware of the consequences of pursuing such stringent climate conditions: besides condensation problems in winter (and consequently moisture damage to collections and historic buildings), energy demands were excessive. Accordingly, the concept of seasonal adjustments was devised, which for example allowed RH to vary from 40% in winter to 55% in summer by manually adjusting the setpoints by 2% per month. In the 2000's, advances in the museum field's view on indoor climate conditioning included an increased focus on sustainability. Among other aspects, this resulted in gradually replacing precautionary safety, e.g., stringent T and RH, by an appropriate environment: this involved employing a pragmatic approach by developing custom requirements for specific cases instead of applying general requirements to all collections and building types.

The European standard EN15757 [1] indicates opportunities for controlled variations in climate parameters and elaborates on a statistical method on how to analyze the historic climate to calculate permissible seasonal variations based on variations that objects already have been exposed to, e.g., the so-called proofed fluctuations concept.

The substantial energy saving potential of less stringent indoor climate control, particularly with respect to various building types and climate regions, has been demonstrated by Kramer [2]: building simulations over one year were used to show the combined effect on energy efficiency of applying collection requirements and thermal comfort requirements. Collection requirements for temperature and relative humidity were based on ASHRAE's Handbook of HVAC Applications (2015, Chapter 23) and in particular the indoor climate classes for museums, galleries, archives, and libraries. However, while [2] demonstrates, via computer simulations, the energy saving potential using long-term measurements, e.g., spanning periods of longer than a year, there is a need for real-time control of the climate parameter(s) in a building zone which considers preservation requirements and facilitates increased energy efficiency and thermal comfort.

REFERENCES

[1] European Committee for Standardization, *EN15757: Conservation of Cultural Property—Specifications for temperature and relative humidity to limit climate induced mechanical damage in organic hygroscopic materials,* 2010.

[2] R. P. Kramer, *Clever Climate Control for Culture: Energy efficient indoor climate strategies for museums respecting collection preservation and thermal comfort of visitors,* Eindhoven University of Technology, 2017.

SUMMARY OF THE INVENTION

One of the objects of the invention is to obtain a control system for a building zone which is climate conditioned by a climate conditioning system, which considers preservation requirements and facilitates increased energy efficiency and thermal comfort.

A first aspect of the invention provides a control system as defined in claim 1 and a computer-implemented method as defined in claim 14.

The control system and method as claimed may be used in cooperation with, or as part of, a building management system. Such building management systems are known per se, and may be configured to control and monitor a building's mechanical and/or electrical equipment. Specifically, a building management system may monitor and control one or more climate conditioning systems in a building. Thereby, instead of directly controlling the climate conditioning system, a user may control the climate conditioning system via the building management system, for example via a user-interface of the building management system. For example, the building management system may allow a user to specify targets (also referred to as setpoints) for climate parameters, such as temperature (T) and relative humidity (RH), in a building zone, such as a room or building space of the building. The climate parameter target(s) may then be provided to a control system, which may cause the climate conditioning system to condition the air in or nearby the building zone so as to reach or maintain the climate parameter target(s) in the building zone. Examples of climate parameter targets are single values, such as the indoor temperature, but also multiple values defining a range, such as a minimum humidity and a maximum humidity.

The control system and method as claimed may calculate the climate parameter target based on a sensor measurement or mean of multiple sensor measurements of the climate parameter from within the building zone, e.g., as obtained from a temperature and/or humidity sensor in or nearby the building zone. From the sensor measurement, the climate parameter target may be calculated as follows: firstly, a running average may be calculated based on the climate parameter measurement and a previous running average value. Such running averages may represent a trend in the climate parameter while filtering-out short-term fluctuations in the climate parameter. Specifically, by calculating the running average based on a current sensor measurement and a previous running average value, it is not needed to rely on future measurements which are normally not available in real-time control systems and/or would introduce latency and thereby cause instability in the control of the climate parameter. From the current running average value, a so-called permissible climate parameter range may be calculated as follows. Firstly, the rate of change in the running average may be limited to a maximum to prevent too large changes in the climate parameter. This 'rate-limited' running average value may then be used to generate the permissible climate parameter range for a next control period. Namely, the running average may be considered as a 'trend curve' for the climate parameter from which the range of permissible climate parameter values may be derived. Specifically, this range may be derived by calculating an upper bound and a lower bound for the climate parameter based on the current rate-limited running average value. In a simple example, such upper bound and lower bound may be obtained by simply establishing a margin around the current rate-limited running average value, e.g., by addition and subtraction of a constant value. In other examples, the upper bound and lower bound may be adaptively calculated, as also described elsewhere. The climate parameter target may then be determined based on the permissible climate parameter range so as cause the climate parameter to reach or remain within the permissible climate parameter range. For example, if the building management system accepts only a single value as climate parameter target, e.g., a temperature setpoint, the climate parameter target may be selected from within, or as one of the boundaries of, the permissible climate parameter range. In other examples, the building management system may accept a minimum and maximum value as climate parameter target, e.g., a minimum humidity setpoint and a maximum humidity setpoint. In such examples, the climate parameter target, e.g., the minimum and maximum, may be selected to match the permissible climate parameter range.

The above measures have the effect that a control system and method are provided which consider preservation requirements while at the same time facilitating energy saving. Namely, energy savings are facilitated by determining the climate parameter target to allow, as much as possible, a 'free-running' of the climate parameter. Here, the term 'free-running' may refer to a natural progression of the climate parameter, e.g., without active climate conditioning. For that purpose, the running average is re-calculated periodically from a current measurement of the climate parameter, allowing the average to follow indoor climate fluctuations. In addition, a permissible climate parameter range is determined which represents a range in which the climate parameter is considered 'permissible'. The permissible parameter range is determined around the running average value of the climate parameter so as to take the trend curve for the climate parameter into account. As such, rather than continuously intervening by active conditioning to reach a preset value, this allows a degree of 'free-running' of the climate parameter which may require less active climate conditioning and thereby contributes to energy efficiency. To nevertheless take preservation requirements into account, the rate of change in the running average value is limited to a maximum before calculating this permissible climate parameter range. Accordingly, too large changes in the climate parameter may be avoided, which may otherwise cause harm, e.g., by harming an in-house collection, a historic building itself, or its historic interior.

Accordingly, the periodic updates of the running average $T_c$, $RH_c$ of the temperature and relative humidity, respectively, may allow the indoor climate to adjust slightly due to varying temperature and relative humidity $T_i$, $RH_i$ in the building zone. Only the rates of change of $T_c$, $RH_c$ may be limited and maximum and minimum limits may be applied. In this way, the indoor climate is not controlled at a fixed setpoint, optionally with a dead band, but rather controlled within a range of temperatures and relative humidities, at a level that is self-adjusting. In other words, the indoor climate may be controlled within set boundary conditions instead of striving to maintain set targets/setpoints. Hence, the indoor climate may be as close as possible to the indoor climate in the unconditioned case (no heating, cooling, humidification and dehumidification), resulting in reduced or near-minimum energy demand. Furthermore, the boundary conditions of the range may be calculated considering thermal comfort requirements, and hence, thermal comfort of the occupants in the building zone may be increased.

Effectively, the climate parameter target may be determined dynamically based on current sensor measurements while considering energy, thermal comfort and preservation requirements. The control system may therefore also be referred to as a dynamic control system, or in cases in which the climate parameter is defined as one or more climate parameter setpoints, as a dynamic setpoint control system. Compared to the use of fixed setpoints for the building management system, the control system may dynamically calculate setpoints by 'self-adjusting' to the current indoor climate.

In an embodiment, the climate parameter target comprises a temperature setpoint $(T_{sp}(i))$, and wherein the processor subsystem is configured to determine the temperature setpoint $(T_{sp}(i))$ by:
if the current indoor temperature $(T_i(i))$ is below the lower bound for the temperature $(T_{min}(i))$, use the lower bound as the temperature setpoint $(T_{sp}(i))$;
if the current indoor temperature $(T_i(i))$ is above the upper bound for the temperature $(T_{max}(i))$, use the upper bound as the temperature setpoint $(T_{sp}(i))$; and
if the current indoor temperature $(T_i(i))$ is in-between the lower bound for the temperature $(T_{min}(i))$ and the upper bound for the temperature $(T_{max}(i))$, maintain a previous selection of the temperature setpoint being either the lower bound $(T_{min}(i))$ or the upper bound $(T_{max}(i))$.

Many building control systems may only accept a single temperature setpoint as input. It may therefore not be possible to directly provide the permissible temperature range as input to the building control system. While one may select the center of the permissible temperature range as the temperature setpoint, a larger degree of 'free-running' of the temperature, and thereby more energy savings, may be obtained by selecting the temperature setpoint in accordance with a relay function. This relay function may be provided in the above-described embodiment as follows. If the current indoor temperature, after limiting, is below the lower bound, the lower bound may be used as temperature setpoint. Similarly, if the current indoor temperature, after limiting, is above the upper bound, the upper bound may be used as temperature setpoint. Finally, if the current indoor temperature is in-between the lower bound and the upper bound, i.e., within the permissible temperature range, a previous selection of the lower bound or the upper bound may be maintained as temperature setpoint, albeit adjusted for the current values of the lower bound and the upper bound. In other words, if in a previous control period a previous lower bound was used as temperature setpoint, and if in a current control period the current indoor temperature is in-between the current lower bound and the current upper bound, the current lower bound may be used as temperature setpoint. This embodiment may therefore enable temperature control with existing building management systems while taking energy, thermal comfort and preservation requirements into account.

In an embodiment, the climate parameter target comprises a minimum humidity setpoint ($RH_{sp,min}(i)$) and a maximum humidity setpoint ($RH_{sp,max}(i)$), and wherein the processor subsystem is configured to determine the minimum humidity setpoint ($RH_{sp,min}(i)$) as the lower bound for the humidity ($RH_{min}(i)$) and the maximum humidity setpoint ($RH_{sp,max}(i)$) as the upper bound for the humidity ($RH_{max}(i)$). Many building control systems may accept a minimum humidity setpoint and a maximum humidity setpoint as input, for example in the form of respective relative humidity (RH) values, e.g., 40% and 60%. While such values are typically held relatively constant by the building management system, in accordance with this embodiment, both setpoints may be selected to dynamically correspond to the respective bounds of the permissible humidity range calculated by the control system.

In an embodiment, the processor subsystem is configured to calculate the current running average value ($T_c(i)$, $RH_c(i)$) as an exponentially weighted moving average (EWMA) of the climate parameter measurement ($T_i(i)$, $RH_i(i)$). Such an exponentially weighted moving average is able to capture trends in the climate parameter while filtering out short-term fluctuations without necessitating future measurements, and thereby well-suited for real-time control. In some embodiments, parameters of the exponentially weighted moving average may be user-selectable, for example via a user interface, such as a graphical user interface, of the control system, or in some embodiments, via a user interface of the building management system. This may allow customization of the filtering to match the time-constant of objects, which may refer to the time that after which an external thermal or hygric stimulus is "experienced" by the object. For example, if the indoor temperature surrounding an object changes instantly from 10° C. to 20° C., the response time is the time that passes until the object is at 19.5° C. (95% of the step size). Analogously, time constant may refer to the time after which 63.2% of the change is penetrated in the object, e.g., in the example the object measures 16.32° C. Consequently, the responsiveness of the setpoint variation may be optimized for different collections, maximizing energy efficiency, without jeopardizing conservation.

In an embodiment, the sensor interface further receives an outside temperature measurement ($T_e(i)$), and wherein the processor subsystem is configured to calculate the current running average value for the temperature ($T_c(i)$) based on:

in a first period within a day, a temperature measurement ($T_c(i)$) of the temperature from within the building zone and the previous running average value for the temperate ($T_c(i-1)$); and in a second period within a day, a running average value ($T_{e,ref}(i)$), such as an exponentially weighted moving average (EWMA) value, of the outside temperature measurement ($T_e(i)$).

As the indoor climate is, among other factors, influenced by the outdoor climate, this embodiment may allow the indoor temperature to decrease slowly if outdoor temperatures drops, and likewise for relative air humidity, during at least a (first) period of a day. The fact that the indoor climate is allowed to follow the outdoor climate, e.g., by re-calculating the running average periodically from a current measurement of the climate parameter, decreases the risk of condensation in internal building envelope constructions substantially. Furthermore, in accordance with this embodiment, the damage risk to a collection may be reduced in case of system failures. For example, if the humidifier malfunctions in winter, the relative air humidity will decrease. However, the rate of change and the amplitude of the humidity drop depends heavily on the difference between indoor and outdoor humidity. In case the running average $T_c$, $RH_c$ is recalculated in the normal operation, namely during at least the (first) period of the day, the difference between indoor and outdoor humidity is likely to be smaller, and hence, the risk for collection damage is lower because (i) the humidity drop after malfunctioning may be less severe and (ii) the humidity rise after restarting the humidifier may be less severe as the climate parameter target has been slowly adjusted. In a specific example, the current running average value for the temperature ($T_c(i)$) may be calculated based an offset (a) and a weighted (b) function of the running average value ($T_{e,ref}(i)$) to include thermal comfort requirements.

It is noted that in other embodiments, the outside temperature measurement may also be taken into account on a continuous basis, e.g., throughout the day. In an embodiment, the second period at least partially lies within daytime or opening hours of the building zone, and wherein the first period at least partially lies outside the daytime or the opening hours. For example, the second period may at least partially lie within the range of 10:00-17:00, 9:00-17:00, 9:00-18:00, 8:00-18:00, etc., or may substantially correspond to one of these ranges. In other embodiments, thermal comfort requirements may be applied only during opening hours, substantially increasing thermal comfort, independently from preservation requirements which may apply 24 hours per day. Hourly updating of the center curves and limiting the rate of change may prevent discontinuities and rapid variations when transitioning from closing to opening hours.

In an embodiment, the maximum rate of change per control period ($dT_{lim}$, $dRH_{lim}$) is calculated based on a maximum rate of change per season ($dT_{max}$, $dRH_{max}$), wherein the maximum rate of change per season is a user-configurable parameter. For example, the maximum rate of change may be specified for each of the seasons individually, e.g., via a graphical user interface.

Various other embodiments are defined by the claims.

It will be appreciated by those skilled in the art that two or more of the above-mentioned embodiments, implementations, and/or aspects of the invention may be combined in any way deemed useful.

Modifications and variations of any one of the computer-implemented method and/or the computer program, which correspond to the described modifications and variations of the control system, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

100 dynamic setpoint control system
120 control interface
122 climate parameter target data
140 sensor interface
142 climate parameter measurement from building zone (inside)
144 climate parameter measurement from building zone (outside)
160 processor subsystem
180 data storage
190 user input interface
192 user input data (collection requirements, comfort requirements)
200 building management system
220 climate conditioning system
222 climate conditioning system control signal
240 climate-controlled building zone (room)
242 supply air
244 exhaust air
300 periodically calculating temperature setpoint
310 receiving temperature measurement
320 calculating running average temperature value
330 limiting rate of change to maximum rate of change
340 calculating upper and lower temperature boundaries
350 determining temperature setpoint as relay function
400 periodically calculating humidity setpoints
410 receiving humidity measurement
420 calculating running average humidity value
430 limiting rate of change to maximum rate of change
440 calculating upper and lower humidity boundaries
450 determining upper and lower humidity setpoints
500 time (month)
510 temperature (degree Celsius)
520 free floating
530 filter without rate limiting
540 filter with rate limiting
550 relative humidity
560 free floating
570 filter without rate limiting
580 filter with rate limiting
600 temperature curve
610 dynamic upper temperature bound
620 dynamic lower temperature bound
650, 652 humidity curve
660 fixed upper temperature bound
670 fixed lower temperature bound
680 dynamic upper temperature bound
690 dynamic lower temperature bound
700 computer-readable medium
710 non-transitory data

DETAILED DESCRIPTION OF EMBODIMENTS

The following relates to a control system which may be configured to dynamically calculate setpoint value(s) for a building management system, and which may therefore also be referred to as a 'dynamic setpoint control system'. The control system may execute a computer-implemented algorithm to calculate the setpoint value(s), which may in the following also simply be referred to as 'algorithm'.

Figure 1:
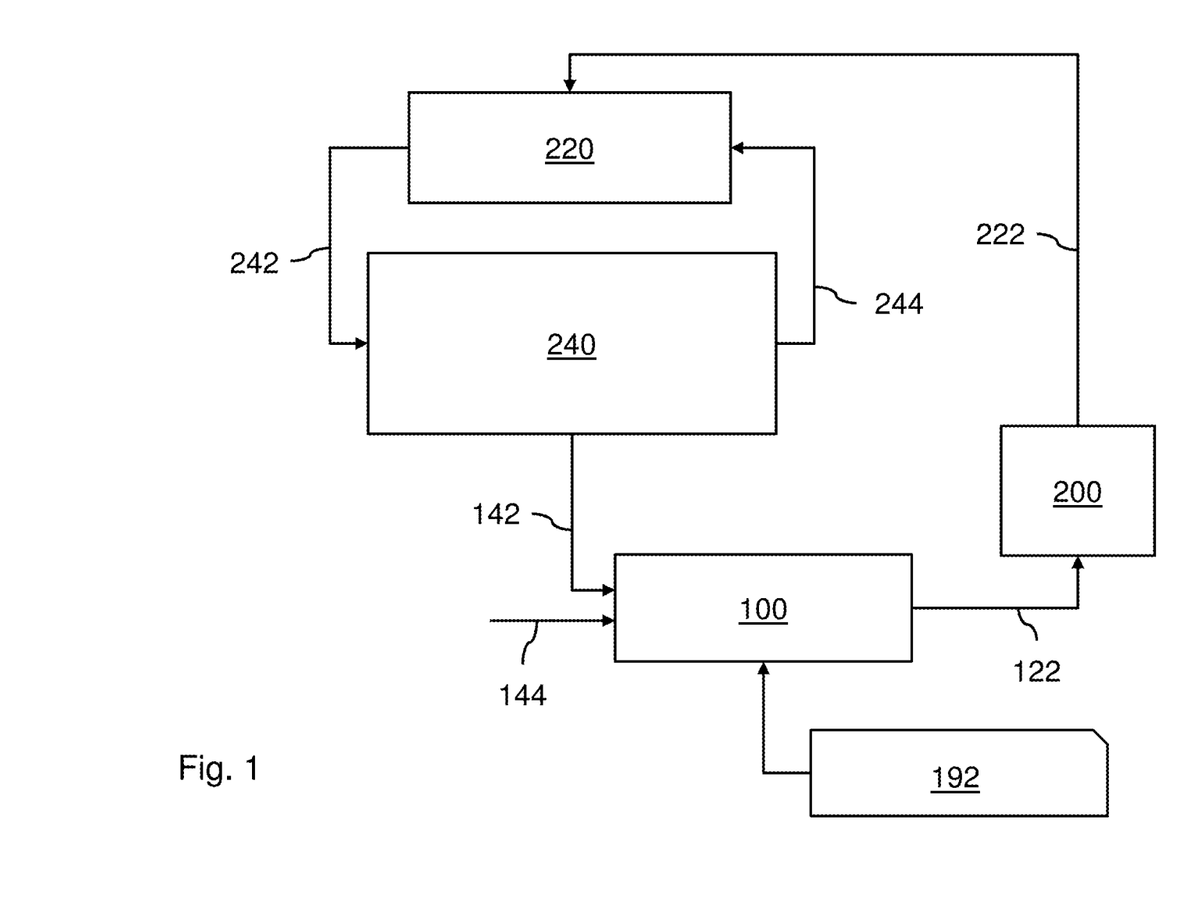
FIG. 1 shows an integration of a dynamic setpoint control system into an HVAC system with a climate control system and a building management system.

FIG. 1 shows a building zone 240 which is climate conditioned by a climate conditioning system 220, e.g., by supplying supply air 242 to the building zone and extracting exhaust air 244 from the building zone. As is known per se, the climate conditioning system 220 may control the temperature and/or humidity in the building zone 240, e.g., using Heating, Ventilation, and Air Conditioning (HVAC) techniques which are known per se. Although not shown in FIG. 1, this may involve the use of one or more heaters, coolers, (de)humidifiers, air-handling units ('air handler'), etc. The climate conditioning system 220 may be managed by a building management system 200 via control signals 222 received from the building management system 200. In particular, the building management system 200 may control the climate conditioning system 220 based on one or more climate parameter targets. These climate parameter targets may conventionally be provided manually by a user to the building management system.

The control system 100 may itself receive a climate parameter measurement of one or more climate parameters from within the building zone 240, such as a temperature measurement and/or a relative humidity measurement. In particular, the climate parameter measurement may pertain to those climate parameters which are also controlled by the climate control system 220. In some embodiments, the control system 100 may also receive a climate parameter measurement from outside of the building zone, e.g., from outside of the building, for example from an outside temperature sensor. The control system 100 may receive the respective climate parameter measurements in the form of respective data 142, 144. It is noted that while FIG. 1 shows the data 142, 144 being received directly from the building zone 240 and the outside, in other embodiments, the data 142, 144 may be received from elsewhere, e.g., from the building management system 200.

In some embodiments, the control system 100 may further receive user input data 192 which may configure various user-configurable aspects of the algorithm. In some embodiments, the user input data 192 may be provided via a user input interface of the control system 100 or the building management system 200, such as a graphical user interface. For example, the user may configure aspects or parameters of the control relating to conservation requirements or to comfort requirements.

Based on the one or more climate parameter measurements, the control system 100 may, using the aforementioned algorithm, calculate a climate parameter target and provide said target in the form of data 122 to the building management system 200. In some embodiments, the said target in the form of data 122 may be provided directly to controllers of the conditioning system 220. In some embodiments, the data format of the data 122 may be determined by the building management system 200, in that the control system 100 may provide the climate parameter target in a form which accepted by the building management system 200. This may allow the control system 100 to interface with conventional building management systems, e.g., in a 'backward compatible' or 'legacy' manner.

In a specific example, the control system 100 may receive measurement data 142 of indoor temperature and relative humidity of the building zone 240. If there are multiple T and RH sensors per building zone 240, the average of the measurement values may be used. As also explained elsewhere, the algorithm executed by the control system 100 may calculate dynamic permissible upper and lower limits of temperature and relative air humidity and determine setpoints for the building management system 200. These setpoints may be calculated in respective control periods, e.g., in hourly time intervals, but other time intervals are possible as well.

Figure 2:
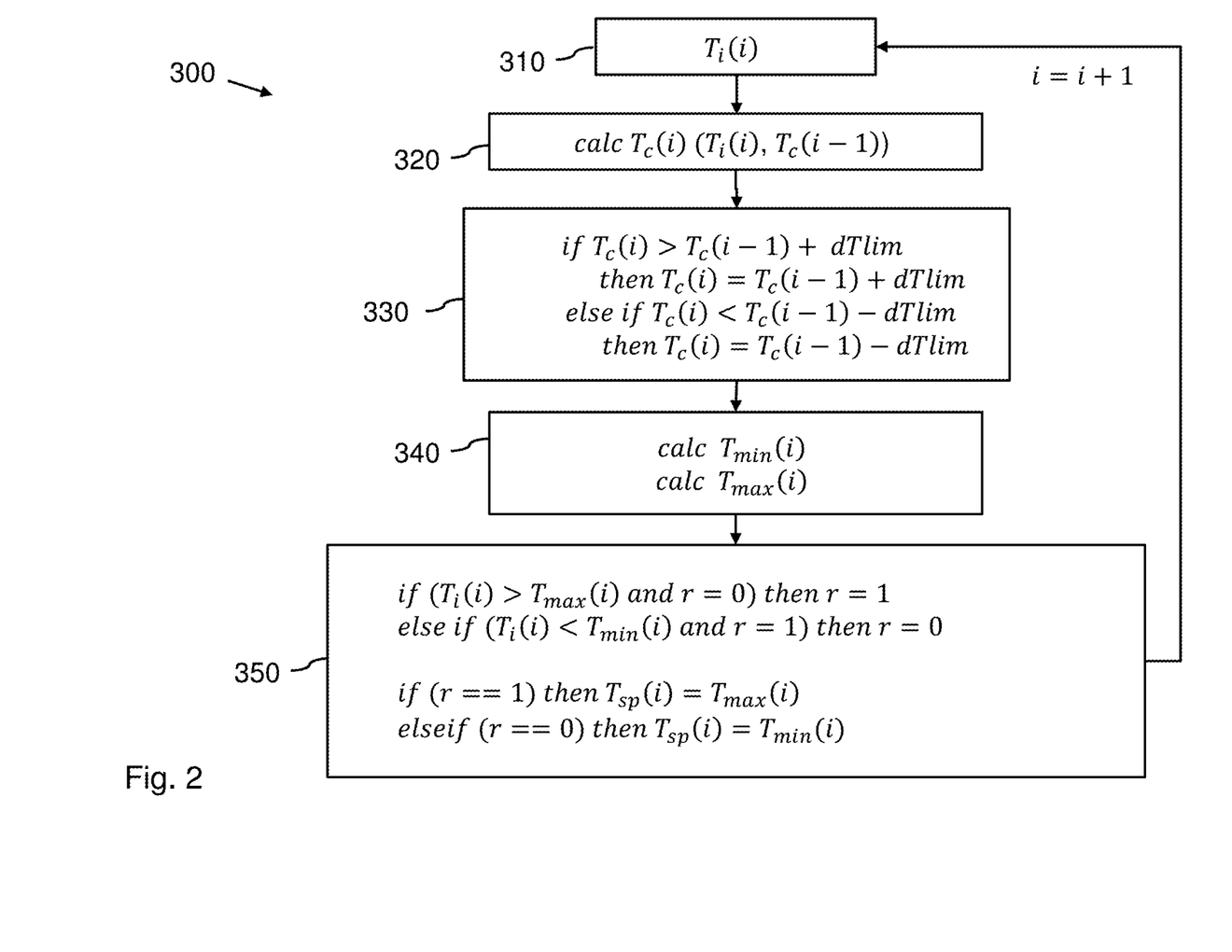
FIG. 2 illustrates dynamic calculation of a temperature setpoint.

FIG. 2 illustrates an embodiment of an operation of the algorithm by showing various steps 310-350 of the algorithm, which may also correspond to a computer-implemented method 300 having respective steps. In this embodiment, the algorithm may calculate a temperature setpoint for the building management system. Here and elsewhere, the variable i may denote respective control periods, which may involve respective executions of the algorithm for respective time intervals, e.g., hourly.

In a step 310, a temperature measurement $T_i(i)$ may be obtained from within the building zone. In a step 320, a current running average value of the temperature $T_c(i)$ may be calculated based on the temperature measurement $T_i(i)$ and a previous running average value $T_c(i-1)$. In a step 330, if a difference between the current running average value of the temperature $T_c(i)$ and a previous running average value $T_c(i-1)$ exceeds a maximum rate of change per control period $dT_{lim}$, the current running average value $T_c(i)$ may be limited to remain within the maximum rate of change. In a step 340, an upper bound $T_{max}(i)$ and a lower bound $T_{min}(i)$ may be calculated for the temperature based on the current running average value $T_c(i)$. The upper bound and the lower bound may together define a permissible climate parameter range, as also later visually shown in FIG. 5A. In a step 350, a temperature setpoint $T_{sp}(i)$ may be calculated as a relay function. In general, if the current indoor temperature $T_i(i)$ is below the lower bound for the temperature $T_{min}(i)$, the lower bound may be used as the temperature setpoint $T_{sp}(i)$; if the current indoor temperature $T_i(i)$ is above the upper bound for the temperature $T_{max}(i)$, the upper bound may be used as the temperature setpoint $T_{sp}(i)$; and if the current indoor temperature $T_i(i)$ is in-between the lower bound for the temperature $T_{min}(i)$ and the upper bound for the temperature $T_{max}(i)$, a previous selection of the temperature setpoint, being either the lower bound $T_{min}(i)$ or the upper bound $T_{max}(i)$, may be maintained. The latter may correspond to a selection, in short 'sel', between $T_{min}(i)$ and $T_{max}(i)$, which is controlled by a previous selection, in short 'prev_sel'.

In the specific example shown in FIG. 2, the relay function may be implemented as follows. If the current indoor temperature $T_i(i)$ is above the upper bound for the temperature $T_{max}(i)$ and a current regime of the climate conditioning system (indicated by parameter 'r' having values '0' for heating and '1' for cooling) is set to 'heating', the regime may be set to 'cooling'. Else, if the current indoor temperature $T_i(i)$ is below the lower bound for the temperature $T_{min}(i)$ and a current regime of the climate conditioning system is set to 'cooling', the regime may be set to 'heating'. If then the regime is set to 'cooling', the temperature setpoint $T_{sp}(i)$ may be set to the upper bound for the temperature $T_{max}(i)$, and else if the regime is set to 'heating', the temperature setpoint $T_{sp}(i)$ may be set to the lower bound for the temperature $T_{min}(i)$. In this example, the parameter r may be used as an internal parameter to be able to maintain a previous selection of the temperature setpoint in case the current indoor temperature $T_i(i)$ is in between both bounds.

Although not shown explicitly, the determined temperature setpoint $T_{sp}(i)$ may then be output to the building management system, and in a next control period i=i+1, the steps 310-350 may be repeated.

It is noted that most museums or other heritage institutes employ a master-slave control for indoor temperature control: the setpoint $T_{sp}$ and measured indoor temperature $T_i$ may be fed to a first (PI-)control loop which may calculate the setpoint for the supply air temperature $T_{sp-sup}$. The measured supply air temperature $T_{sup}$ and $T_{sp-sup}$ may then be fed to a second (PI-)control loop. Consequently, most existing control systems only accept one single setpoint for temperature instead of two setpoints representing the temperature range (maximum and minimum). The concept of a relay as described above may provide compatibility in such cases.

Figure 3:
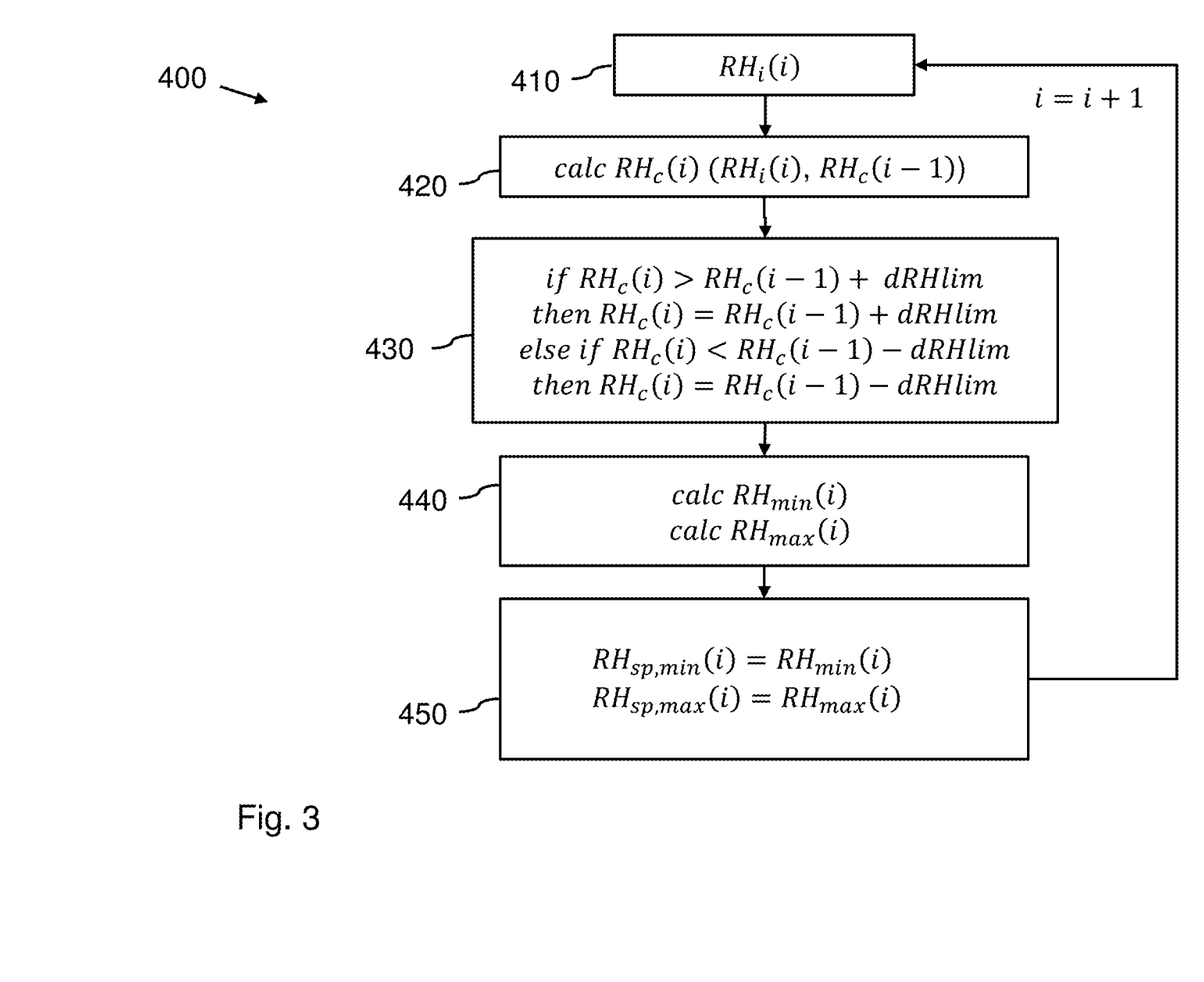
FIG. 3 illustrates dynamic calculation of relative humidity setpoints.

FIG. 3 illustrates another embodiment of an operation of the algorithm by showing various steps 410-450 of the algorithm, which may also correspond to a computer-implemented method 400 having respective steps. In this embodiment, the algorithm may calculate humidity setpoints for the building management system.

In a step 410, a measurement RH(i) of the humidity, and more specifically the relative air humidity, may be received from within the building zone. In a step 420, a current running average value of the humidity $RH_c(i)$ may be calculated based on the humidity measurement RH(i) and a previous running average value $RH_c(i-1)$. In a step 430, if a difference between the current running average value of the humidity $RH_c(i)$ and the previous running average value $RH_c(i-1)$ exceeds a maximum rate of change per control period $dRH_{lim}$, the current running average value $RH_c(i)$ may be limited to remain within the maximum rate of change. In a step 440, an upper bound $RH_{max}(i)$) and a lower bound $RH_{min}(i)$ may be calculated for the humidity based on the current running average value $RH_c(i)$, the upper bound and the lower bound defining a permissible climate parameter range. In a step 450, the minimum humidity setpoint $RH_{sp,min}(i)$ of the building management system may be determined as the lower bound for the humidity $RH_{min}(i)$ and the maximum humidity setpoint $RH_{sp,max}(i)$ of the building management system may be determined as the upper bound for the humidity $RH_{max}(i)$. Although not shown explicitly, the humidity setpoints may then be output to the building management system, and in a next control period i=i+1, the steps 410-450 may be repeated.

In some embodiments, the embodiments of FIGS. 2 and 3 may be combined, in that for a particular control period, both a temperature setpoint as well as minimum and maximum humidity setpoints are calculated for the building management system.

In some embodiments, the upper bound $T_{max}(i)$, $RH_{max}(i)$ may be calculated based on: i) the current running average value $T_c(i)$, $RH_c(i)$, ii) a user-configurable parameter representing a maximum value for the climate parameter $T_{coll,max}$, $RH_{coll,max}$, and iii) a user-configurable parameter representing a permissible short-term fluctuation in the climate parameter $T_{coll,short}$, $RH_{coll,short}$. In a specific embodiment, the upper bound $T_{max}(i)$, $RH_{max}(i)$ may be calculated as a minimum of j) the current running average value $T_c(i)$, $RH_c(i)$, and jj) the user-configurable parameter representing the maximum value for the climate parameter $T_{coll,max}$, $RH_{coll,max}$ minus the user-configurable parameter representing the permissible short-term fluctuation in the climate parameter $T_{coll,short}$, $RH_{coll,short}$.

In some embodiments, the lower bound $T_{min}(i)$, $RH_{min}(i)$ may be calculated based on i) the current running average value $T_c(i)$, $RH_c(i)$, ii) a user-configurable parameter representing a minimum value for the climate parameter $T_{coll,min}$, $RH_{coll,min}$, and iii) a further user-configurable parameter representing a permissible short-term fluctuation in the climate parameter $T_{coll,short}$, $RH_{coll,short}$. In a specific embodiment, the lower bound $T_{min}(i)$, $RH_{min}(i)$ may be calculated as a maximum of: j) the current running average value $T_c(i)$, $RH_c(i)$, and jj) the user-configurable parameter representing the minimum value for the climate parameter $T_{coll,min}$, $RH_{coll,min}$ plus the user-configurable parameter representing a permissible short-term fluctuation in the climate parameter $T_{coll,short}$, $RH_{coll,short}$.

In general, the algorithm may use one or more of the following as inputs:
  Current (average) indoor temperature: $T_i(i)$
  Current (average) indoor relative air humidity: $RH_i(i)$
  Current outdoor temperature (e.g., for thermal comfort): $T_e(i)$.

The algorithm may further calculate one or more of the following as outputs:
  Minimum indoor temperature during the current control period, e.g., one hour: $T_{min}(i)$
  Maximum indoor temperature during the current control period, e.g., one hour: $T_{max}(i)$
  Single setpoint for indoor temperature (in case of master-slave control with supply air temperature) during the current control period, e.g., one hour: $T_{sp}(i)$
  Minimum indoor RH during the current control period, e.g., one hour: $RH_{min}(i)$
  Maximum indoor RH during the current control period, e.g., one hour: $RH_{max}(i)$
  Heating mode or Cooling mode activated As initialization parameters, the algorithm may receive:
  Initial value for indoor temperature: $T_{init}$
  Initial value for indoor RH: $RH_{init}$ The algorithm may further use other parameters relating to the rate of change of the climate parameter (for example as required for collection conservation). The parameters may be custom defined or compliant with guidelines and/or standards, e.g.:
  Maximum rate of change of indoor temperature: dTmax [° C., e.g., per 3 months]
  Maximum rate of change of indoor RH: dRHmax [%, e.g., per 3 months]
  Maximum short-term fluctuation of indoor temperature: $T_{coll,short}$
  Maximum short-term fluctuation of indoor RH: $RH_{coll,short}$
  Lower limit of indoor temperature: $T_{coll,min}$
  Upper limit of indoor temperature: $T_{coll,max}$
  Lower limit of indoor RH: $RH_{coll,min}$
  Upper limit of indoor RH: $RH_{coll,max}$ The algorithm may further use various parameters which may be associated with thermal comfort of occupants of the building zone, and which may be referred to as thermal comfort parameters. These thermal comfort parameters may be custom-defined or compliant with guidelines and/or standards, e.g.:
  Maximum short-term fluctuation of indoor temperature: $T_{comf,short}$
  Lower limit of indoor temperature: $T_{comf,min}$
  Upper limit of indoor temperature: $T_{comf,max}$
  First hour of day that comfort requirements need to be considered: $h_{start}$
  Last hour of day that comfort requirements need to be considered: $h_{end}$ During operation, the algorithm may compute various variables, including but not limited to:
  Center curve for temperature without short-term fluctuations: $T_c(i)$
  Center curve for RH without short-term fluctuations: $RH_c(i)$
  The reference outdoor temperature to calculate the thermal comfort requirements: $T_{eref}(i)$ At startup of the algorithm, the variables $T_c(i)$ and $RH_c(i)$ may be initialized by setting their values to the values of $RH_{init}$ and $T_{init}$. If $T_{init}$ and $RH_{init}$ are set to the current indoor climate values, e.g., $T_i(i)$ and $RH_i(i)$, the algorithm may prevent rapid changes and starts slowly adjusting from the current indoor climate conditions. If other levels are preferred at start-up, $T_{init}$ and $RH_{init}$ may be user-supplied, e.g., as described elsewhere with reference to the 'user input interface'.

If comfort requirements are considered, $T_{eref}(i)$ may be initialized by setting the value to the current outdoor temperature $T_e(i)$.

Alternatively, the algorithm may be initialized based on a so-called 'historic climate'. This may for example occur in the following scenario. Loan exhibitions are very common and require the transportation of collection items from location A to B. Objects are acclimatized to the (historic) indoor climate conditions at location A, and hence, the indoor climate conditions at location B should follow from the indoor climate conditions at location A. The algorithm may be used to calculate the initial temperature and relative humidity ranges at location B based on the historic climate from location A, ensuring a seamless transition for loan collections.

The temperature and humidity levels may be controlled as follows. Here, reference to the concept of a 'center curve' is made, which corresponds to the recursive filtering and rate-limiting of the respective climate parameter measurement, which if set out against time may yield a function in time, e.g., a curve.

If comfort requirements are considered, the reference outdoor temperature $T_{eref}(i)$ may be computed according to an exponentially weighted moving average of the outdoor temperature $T_{ex}(i)$:

$$T_{eref}(i) = \frac{T_{ex}(i) + T_{eref}(i-1) * (\alpha - 1)}{\alpha}$$

By default, α may be chosen to be 48 hours to balance (1) the effectiveness of filtering out short-term fluctuations, and (2) minimizing the phase shift resulting from the filtering process, but various other values for α may be selected as well.

During the hours of the day that thermal comfort requirements should be considered, the center curve for temperature may be calculated according to $T_c(i)=a+b*T_{eref}(i)$ The factors a and b determine the slope and level of the comfort temperatures, for example with default values of 19.5 and 0.175 respectively.

For hours that comfort is not considered or if comfort is not considered at all, i.e., only preservation requirements are considered, the center curve for temperature $T_c(i)$ may be calculated according to an exponentially weighted moving average of the indoor temperature, for example according to:

$$T_c(i) = \frac{T_i(i) + T_c(i-1) * (\beta - 1)}{\beta}$$

By default, β may be chosen to be 336 hours (14 days) to balance (1) the effectiveness of filtering out short-term fluctuations, and (2) minimizing the phase shift resulting from the filtering process, but various other values may be selected as well. The center curve for relative humidity $RH_c(i)$ may analogously be computed as:

$$RH_c(i) = \frac{RH_i(i) + RH_c(i-1) * (\beta - 1)}{\beta}$$

Maximum permissible changes per season, such as included in guidelines and/or standards, may implemented as a limited rate of change per hour, or in general per control period. The rate of change may be controlled by limiting the rate of change of the center curves $T_c(i)$ and $RH_c(i)$, for example according to:

$$dRHlim = \frac{dRHmax}{\frac{365}{4} * 24}$$

$$dTlim = \frac{dTmax}{\frac{365}{4} * 24}$$

The rate of change may be applied to $RH_c(i)$ according to:
IF $RH_c(i)-RH_c(i-1)>$dRHlim
THEN $RH_c(i)=RH_c(i-1)+$dRHlim
ELSEIF $RH_c(i-1)-RH_c(i)>$dRHlim
THEN $RH_c(i)=RH_c(i-1)-$dRHlim END.

The rate of change of the center curve for temperature $T_c(i)$ may be limited according to:
IF $T_c(i)-T_c(i-1)>$dTlim
THEN $T_c(i)=T_c(i-1)+$dTlim
ELSEIF $T_c(i-1)-T_c(i)>$dTlim
THEN $T_c(i)=T_c(i-1)-$dTlim
END.

Figure 4A:
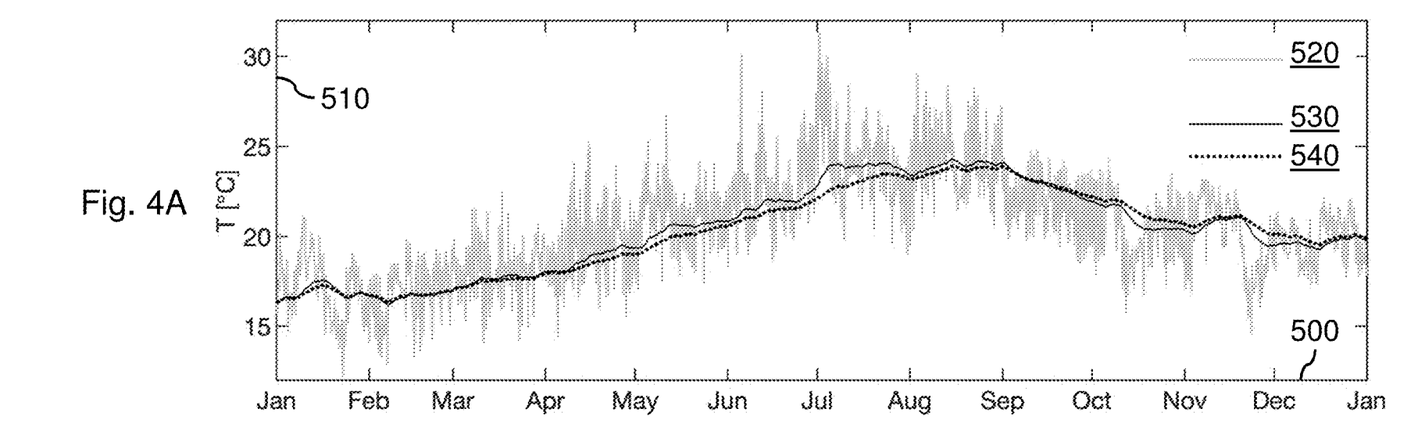
FIG. 4A shows a free-floating indoor temperature and the indoor temperature when climate controlled using a temperature setpoint which is obtained by temporal recursive filtering with rate limiting and without rate limiting.
Figure 4B:
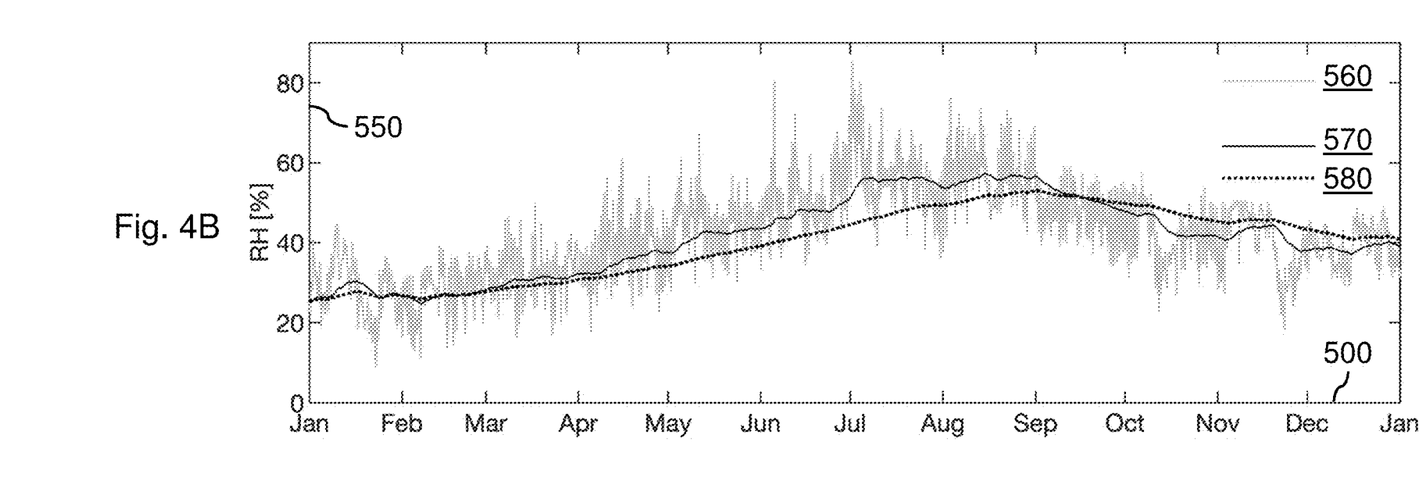
FIG. 4B shows a free-floating indoor humidity and the indoor humidity when climate controlled using maximum and minimum humidity setpoints which are obtained by temporal recursive filtering with rate limiting and without rate limiting.

FIGS. 4A and 4B show an exemplary free-floating indoor climate (temperature and relative humidity, respectively) and the resulting center curves $T_c$ and $RH_c$ using the presented filter with specific settings. In particular, FIG. 4A sets out time-of-year on the X-axis 500 against temperature on the Y-axis 510, and shows a free-floating indoor temperature 520 and the indoor temperature when climate controlled using a temperature setpoint which is obtained by temporal recursive filtering with rate limiting (reference numeral 540) and without rate limiting (reference numeral 530).

Furthermore, FIG. 4B sets out time-of-year on the X-axis 500 against relative humidity on the Y-axis 550, and shows a free-floating indoor humidity 560 and the indoor humidity when climate controlled using maximum and minimum humidity setpoints which are obtained by temporal recursive filtering with rate limiting (reference numeral 580) and without rate limiting (reference numeral 570). In both FIGS. 4A and 4B, the rate-limiting uses a beta-factor of 14 days (β=336 hours), and the filtered temperature and relative humidity is set with rate limiting to 10° C. and 20% per season.

Having determined the respective center curves, permissible ranges for the temperature and relative humidity may be determined as follows. For the hours on the day that comfort requirements are considered, the permissible short-term temperature fluctuation $T_{short}$ may be the minimum value of (1) the permissible short-term temperature fluctuation dictated by comfort requirements $T_{comf,short}$ and (2) the permissible short-term temperature fluctuation dictated by collection requirements $T_{coll,short}$ If comfort requirements are not considered, but rather only preservation requirements, the permissible short-term temperature fluctuation may be dictated by the collection requirements $T_{coll,short only}$.

The absolute maximum value of the center curve $RH_c(i)$ may be calculated by taking the minimum value of (1) the center curve $RH_c(i)$, and (2) the maximum value dictated by collection requirements $RH_{coll,max}$ minus the permissible short-term fluctuation for collection $RH_{coll,short}$ The absolute minimum value of the center curve $RH_c(i)$ may be calculated by taking the maximum value of (1) the center curve $RH_c(i)$, and (2) the minimum value for the collection $RH_{coll,min}$ plus the permissible short-term fluctuation limit for collection $RH_{coll,short}$.

The absolute maximum value of the center curve $T_c(i)$ may be calculated by taking the minimum value of (1) the center curve $T_c(i)$, and (2) maximum value for collection $T_{coll,max}$ minus the short-term fluctuation limit $T_{short}$.

The absolute minimum value of the center curve $T_c(i)$ may be calculated by taking the maximum value of (1) the center curve $T_c(i)$, and (2) the minimum value for collection $T_{coll,min}$ plus the short-term fluctuation limit $T_{short}$.

The upper limit $RH_{max}(i)$ may be calculated by adding the short-term limit $RH_{coll,short}$ to the center curve $RH_c(i)$. The lower limit $RH_{min}(i)$ may be calculated by subtracting the short-term limit $RH_{coll,short}$ from the center curve $RH_c(i)$.

The upper limit $T_{max}(i)$ may be calculated by adding the short-term limit $T_{short}$ to the center curve $T_c(i)$. The lower limit $T_{min}(i)$ may be calculated by subtracting the short-term limit $T_{short}$ from the center curve $T_c(i)$.

Figure 5A:
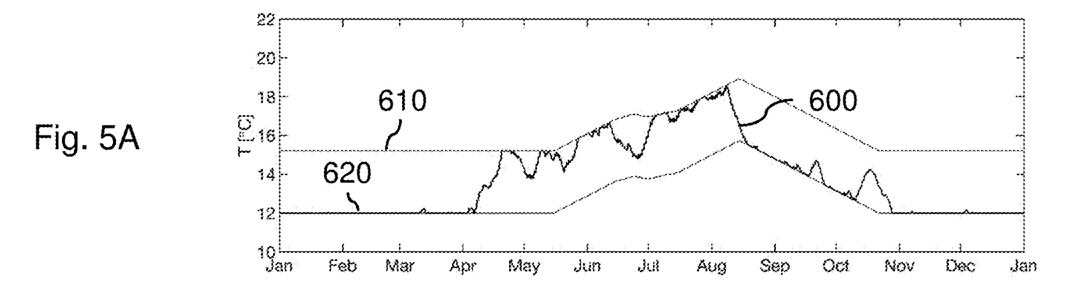
FIG. 5A shows the indoor temperature maintained between dynamic upper and lower bounds ($\beta=14$ days, maximum change of 10° C. per season)

FIG. 5A illustrates indoor temperature 600 maintained between dynamic upper and lower bounds 610, 620 (β=14 days, maximum change of 10° C. per season) as determined in the above-described manner. In particular, as also described with reference to FIG. 2, FIG. 5A shows a result of the temperature setpoint being selected as either the upper bound 610 or the lower bound 620 in accordance with a relay function, while showing the resulting indoor temperature 600 in the building zone.

Figure 5B:
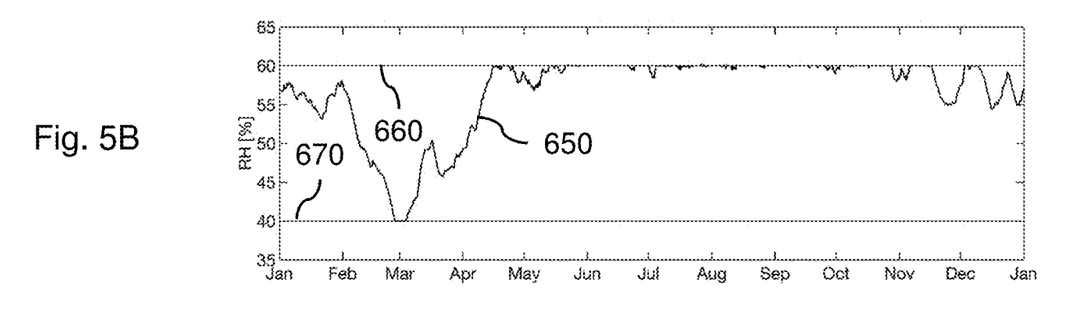
FIG. 5B shows the indoor relative air humidity maintained between fixed upper and lower bounds.
Figure 5C:
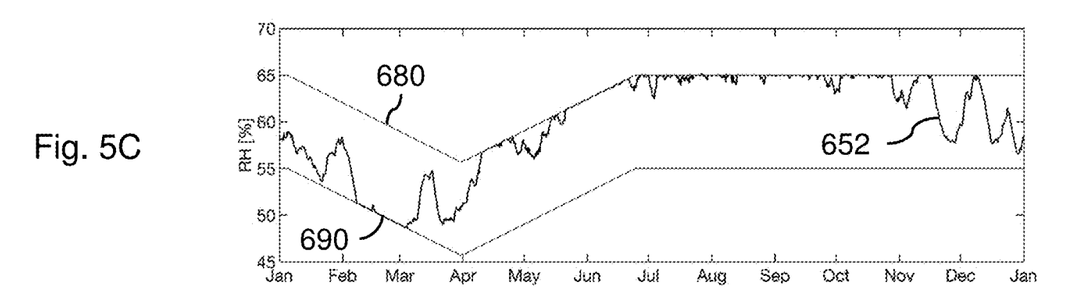
FIG. 5C shows the indoor relative air humidity maintained between dynamic upper and lower bounds ($\beta=14$ days, maximum change of 10% RH per season)

FIG. 5B illustrates indoor relative air humidity 650 maintained between fixed upper and lower bounds 660, 670, whereas FIG. 5C illustrates indoor relative air humidity maintained between dynamic upper and lower bounds ($\beta$=14 days, maximum change of 10% RH per season) as determined in the above-described manner.

In particular, as also described with reference to FIG. 3, FIG. 5C shows a result of the minimum and maximum humidity setpoints being selected as the respective bounds 680, 690 which are dynamically calculated by the algorithm, while showing the resulting indoor relative humidity 652 in the building zone.

In general, $T_c/RH_c$ may be calculated, e.g., using every hour or other suitable time interval, using a weighted average of the currently measured indoor conditions $T_i/RH_i$ and the current values of $T_c/RH_c$. This may yield the same result as an exponentially weighted moving average of $T_i/RH_c$, however, instead of N values back in time, only the current values of $T_c/RH_c$ and $T_i/RH_i$ may be needed. This makes the algorithm more robust and independent of historic data. Furthermore, because the averaging is not performed with a past-window, future values are not necessary as in standard EN15757 [1].

Figure 6:
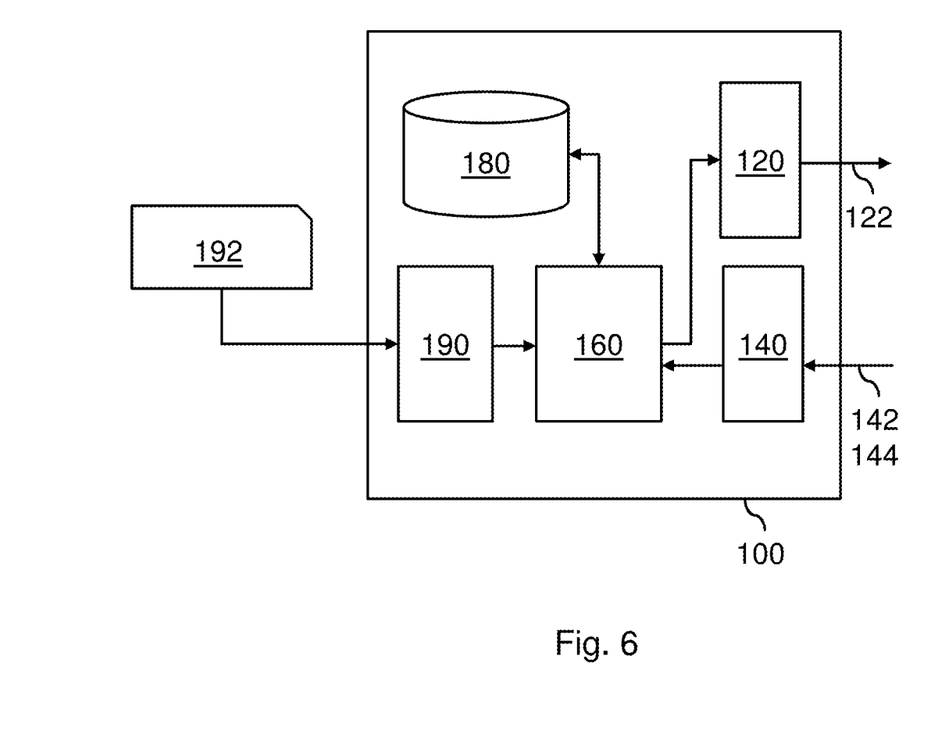
FIG. 6 shows a detailed view of a dynamic setpoint control system.

FIG. 6 shows a detailed view of a control system 100 as described with reference to FIG. 1 and elsewhere. The control system 100 is shown to comprise a control interface 120 to a building management system. The control interface 120 may take any suitable form, such as a network interface, e.g., a wired network interface based on Ethernet or fiber-optics or a wireless network interface based on Wi-Fi, ZigBee, Bluetooth, etc. The control interface may also take the form of a low-level electrical interface, or may in some embodiments (e.g., if the control system 100 is implemented as a software component running alongside the building management system) take the form of a software interface, e.g., based on APIs. Data communication 122 with the building management system may be based on open protocols such as BACnet, LONworks or Modbus or any other suitable protocol. The control system 100 is further shown to comprise a sensor interface 140 for receiving internal climate parameter measurements 142 and in some embodiments external climate parameter measurements 144. The sensor interface 140 may take any suitable form, such as a network interface, e.g., a wired network interface based on Ethernet or fiber-optics or a wireless network interface based on Wi-Fi, ZigBee, Bluetooth, etc. The sensor interface 140 may also take the form of a low-level electrical interface. In general, the sensor interface 140 may be a direct interface to a sensor, but also a data interface for accessing measurement data of a sensor which is stored or buffered elsewhere. For example, in some embodiments, both the sensor interface 140 and the control interface 120 may be embodied by a network interface to the building management system.

The control system 100 is further shown to comprise a processor subsystem 160 which may be configured to perform the functions as described elsewhere with reference to the control system and/or the algorithm.

In general, the control system 100 may be embodied as, or in, a single device or apparatus, such as a workstation, e.g., laptop or desktop-based, or a server, or a controller, such as a programmable logic controller (plc). The device or apparatus or controller may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the control system 100, e.g., the control interface, the sensor interface and the processor subsystem, may be implemented in the device or apparatus in the form of programmable logic, e.g., as a Field-Programmable Gate Array (FPGA). In general, each functional unit of the system may be implemented in the form of a circuit. It is noted that the control system 100 may also be implemented in a distributed manner, e.g., involving different devices or apparatuses or controllers, e.g., involving cloud computing servers. In some embodiments, the control system 100 may be part of the building management system.

The control system 100 is further shown to comprise a user input interface 190 for receiving user input data 192, which may correspond to any user-specifiable parameter as described in this specification. Although not explicitly shown, the user input interface may be connectable to a user input device, such as a mouse, keyboard, touchscreen, etc., which may enable a user to provide the user input data 192. In some embodiments, the user input interface 190 may be an input interface component of a graphical user interface. In some embodiments, the user input interface may be integrated with the building management software as an add-on.

Figure 7:
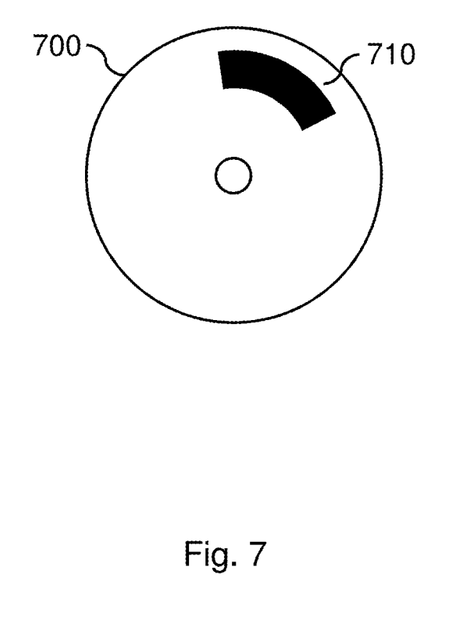
FIG. 7 shows a computer-readable medium comprising non-transitory data.

It is noted that any of the methods described in this specification, for example in any of the claims, may be implemented on a computer as a computer-implemented method, as dedicated hardware, or as a combination of both. Instructions for the computer, e.g., executable code, may be stored on a computer readable medium 700 as for example shown in FIG. 7, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows by way of example an optical storage device 700.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A control system for a building zone which is climate conditioned by a climate conditioning system, wherein the climate conditioning system controls at least one climate parameter in the building zone, the climate parameter being at least one of: temperature and humidity,
the control system comprising:
a control interface to a building management system, wherein the building management system is configured to receive, via the control interface, a climate parameter target for the climate parameter and to control the climate conditioning system to establish the climate parameter in the building zone in accordance with the climate parameter target;
a sensor interface for receiving a climate parameter measurement of the climate parameter from within the building zone;
a processor subsystem configured to periodically calculate the climate parameter target for respective control periods by, in a current control period:
calculate a current running average value based on the climate parameter measurement and a previous running average value;
if a difference between the current running average value and the previous running average value exceeds a maximum rate of change per control period, limit the current running average value to remain within the maximum rate of change;
calculate an upper bound and a lower bound for the climate parameter based on the current running average value, the upper bound and the lower bound defining a permissible climate parameter range;
determine the climate parameter target based on the permissible climate parameter range so as to cause the climate parameter to reach, or remain within, the permissible climate parameter range; and
via the control interface, output the climate parameter target to the building management system.

2. The control system according to claim 1, wherein the climate parameter target comprises a temperature setpoint, and wherein the processor subsystem is configured to determine the temperature setpoint by:
if the current indoor temperature is below the lower bound for the temperature, use the lower bound as the temperature setpoint;
if the current indoor temperature is above the upper bound for the temperature, use the upper bound as the temperature setpoint; and
if the current indoor temperature is in-between the lower bound for the temperature and the upper bound for the temperature, maintain a previous selection of the temperature setpoint being either the lower bound.

3. The control system according to claim 2, wherein the climate parameter target comprises a minimum humidity setpoint and a maximum humidity setpoint, and wherein the processor subsystem is configured to determine the minimum humidity setpoint as the lower bound for the humidity and the maximum humidity setpoint as the upper bound for the humidity.

4. The control system according to claim 2, wherein the processor subsystem is configured to calculate the current running average value as an exponentially weighted moving average of the climate parameter measurement.

5. The control system according to claim 2, wherein the sensor interface further receives an outside temperature measurement, and wherein the processor subsystem is configured to calculate the current running average value for the temperature based on:
in a first period within a day, a temperature measurement of the temperature from within the building zone and the previous running average value for the temperature; and
in a second period within a day, a running average value, such as an exponentially weighted moving average value, of the outside temperature measurement.

6. The control system according to claim 5, wherein the second period at least partially lies within daytime or opening hours of the building zone, and wherein the first period at least partially lies outside the daytime or the opening hours.

7. The control system according to claim 2, wherein the maximum rate of change per control period is calculated based on a maximum rate of change per season, wherein the maximum rate of change per season is a user-configurable parameter.

8. The control system according to claim 1, wherein the climate parameter target comprises a minimum humidity setpoint and a maximum humidity setpoint, and wherein the processor subsystem is configured to determine the minimum humidity setpoint as the lower bound for the humidity and the maximum humidity setpoint as the upper bound for the humidity.

9. The control system according to claim 1, wherein the processor subsystem is configured to calculate the current running average value as an exponentially weighted moving average of the climate parameter measurement.

10. The control system according to claim 1, wherein the sensor interface further receives an outside temperature measurement, and wherein the processor subsystem is configured to calculate the current running average value for the temperature based on:
in a first per'iod within a day, a temperature measurement of the temperature from within the building zone and the previous running average value for the temperature; and
in a second period within a day, a running average value, such as an exponentially weighted moving average value, of the outside temperature measurement.

11. The control system according to claim 10, wherein the second period at least partially lies within daytime or opening hours of the building zone, and wherein the first period at least partially lies outside the daytime or the opening hours.

12. The control system according to claim 1, wherein the maximum rate of change per control period is calculated based on a maximum rate of change per season, wherein the maximum rate of change per season is a user-configurable parameter.

13. The control system according to claim 1, wherein the processor subsystem is configured to calculate at least one of:
the upper bound based on:
i) the current running average value,
ii) a user-configurable parameter representing a maximum value for the climate parameter, and
iii) a user-configurable parameter representing a permissible short-term fluctuation in the climate parameter; and
the lower bound based on:
i) the current running average value,
ii) a user-configurable parameter representing a minimum value for the climate parameter, and iii) a further user-configurable parameter representing a permissible short-term fluctuation in the climate parameter.

14. The control system according to claim 13, wherein the processor subsystem is configured to calculate at least one of:

the upper bound as a minimum of:
j) the current running average value, and
jj) the user-configurable parameter representing the maximum value for the climate parameter minus the user-configurable parameter representing the permissible short-term fluctuation in the climate parameter; and the lower bound as a maximum of:
j) the current running average value, and
jj) the user-configurable parameter representing the minimum value for the climate parameter plus the user-configurable parameter representing a permissible short-term fluctuation in the climate parameter.

15. The control system according to claim 1, wherein the control period has a length selected from 1 minute to 24 hours.

16. The control system according to claim 1, further comprising a user input interface for enabling a user to specify any user-configurable parameter.

17. A building comprising the control system according to claim 1.

18. The building according to claim 17, being one of: a museum, a museum storage facility, an archive, a library, a gallery and a church.

19. A computer-implemented method for calculating a climate parameter target for a building zone which is climate conditioned by a climate conditioning system, wherein the climate conditioning system controls at least one climate parameter in the building zone, the climate parameter being at least one of: temperature and humidity, wherein the building management system is configured to control the climate conditioning system to establish the climate parameter in the building zone in accordance with the climate parameter target, the method comprising:
receiving a climate parameter measurement of the climate parameter from within the building zone;
periodically calculating the climate parameter target for respective control periods by, in a current control period:
calculating a current running average value based on the climate parameter measurement and a previous running average value;
if a difference between the current running average value and the previous running average value exceeds a maximum rate of change per control period, limiting the current running average value to remain within the maximum rate of change;
calculating an upper bound and a lower bound for the climate parameter based on the current running average value, the upper bound and the lower bound defining a permissible climate parameter range;
determining the climate parameter target based on the permissible climate parameter range so as to cause the climate parameter to reach, or remain within, the permissible climate parameter range; and
providing the climate parameter target to the building management system.

20. A computer-readable medium comprising transitory or non-transitory data representing a computer program, the computer program comprising instructions for causing a processor system to perform the method according to claim 19.

* * * * *